I. V. ADAIR.
Corn Harvester.

No. 19,822.

Patented April 6, 1858.

UNITED STATES PATENT OFFICE.

I. V. ADAIR, OF VARICK, NEW YORK.

IMPROVEMENT IN CORN-HARVESTERS.

Specification forming part of Letters Patent No. 19,822, dated April 6, 1858.

*To all whom it may concern:*

Be it known that I, ISAAC V. ADAIR, of Varick, in the county of Seneca and State of New York, have invented a new and Improved Indian-Corn or Maize Harvester; and I do hereby declare that the following is a full, clear, and exact description of the same, reference being had to the annexed drawings, making a part of this specification, in which—

Figure 1:
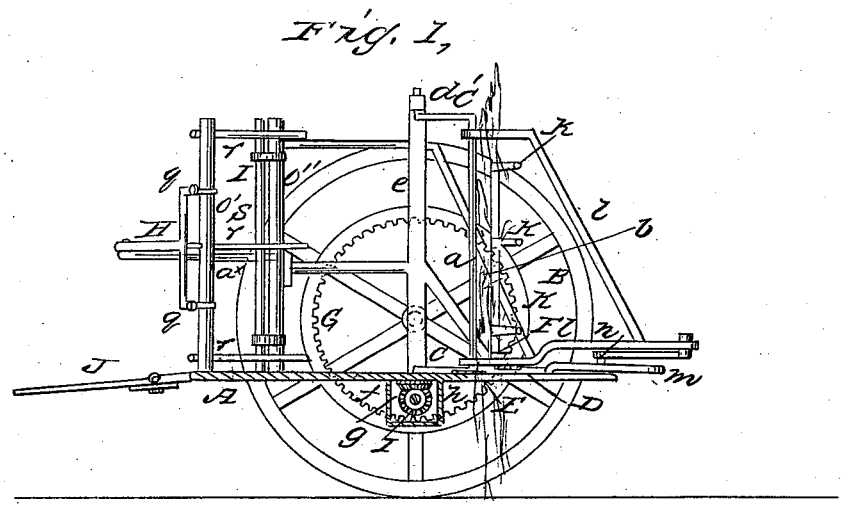
Figure 2:
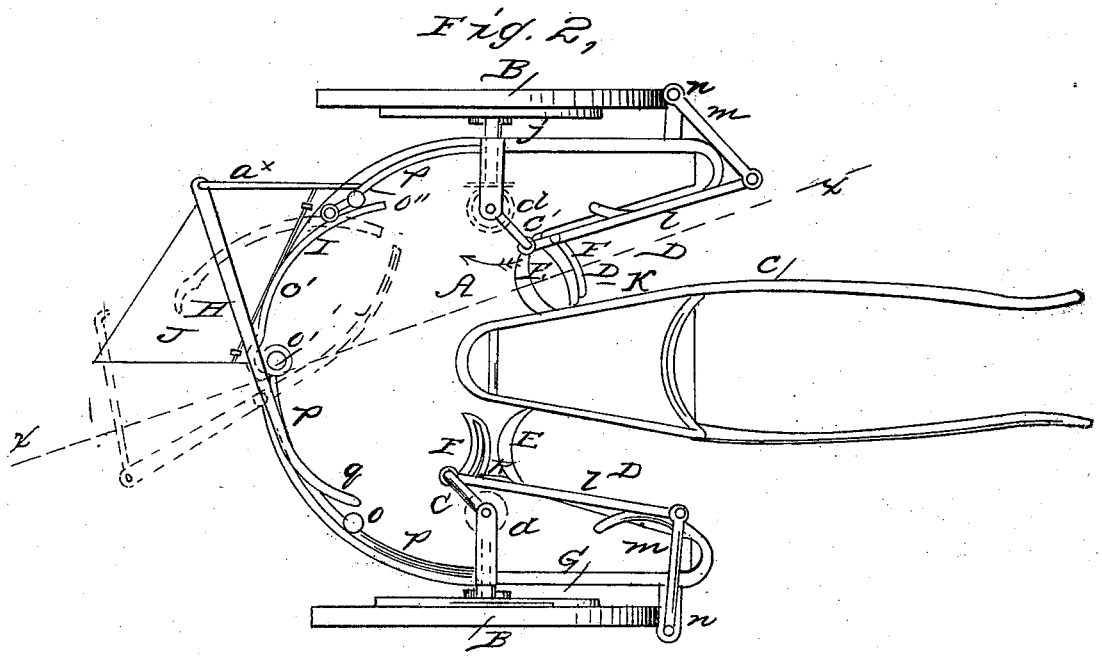

Figure 1 is a vertical section of my improvement, taken in the line $xx$ of Fig. 2. Fig. 2 is a plan or top view of the same.

Similar letters of reference indicate corresponding parts in the two figures.

This invention consists in the employment or use of two scythe-shaped cutters operated in a peculiar way and working over stationary cutters and used in connection with a discharging device, as hereinafter described, whereby the standing stalks, as the machine is drawn along, are cut at a proper distance from the surface of the ground, guided or thrown onto a platform, collected into compact form, and, after being bound by an attendant, discharged from said platform upon the ground.

To enable others skilled in the art to make and use my invention, I will proceed to describe its construction and operation.

A represents a platform, which is mounted on two wheels, B B, and has a pair of thills, C, attached to its front end. In the front part of the platform, and at each side of the thills, a recess, D, is formed. These recesses are not parallel with each other. Their inner ends are nearer together than their outer ones, as will be seen by referring to Fig. 2.

At the inner end of each recess D a stationary curved cutter, E, is attached, and over each of these cutters E a curved or scythe-shaped cutter, F, works. The cutters F are attached each to the lower ends of two vertical and parallel rods, $a\ b$. The rods $a$, at their ends, are connected to horizontal arms $c\ c'$. The upper arms, $c'$, are fitted in bearings $d$ at the upper ends of vertical rods $e$, attached to the platform, one at each side, and the lower arms, $c$, are attached to the upper ends of the axes or shafts of bevel-pinions $f$, which are placed underneath the platform and gear into corresponding pinions, $g$, also placed underneath the platform, and fitted in boxes $h$. The pinions $g$ are attached to horizontal shafts $i$, the outer ends of which have each a pinion, $j$, attached. These pinions gear into toothed rims G G, which are attached to the inner sides of the wheels B B, one to each, and concentric with them.

To the rods $b$ horizontal teeth or arms R are attached. These teeth or arms may be of slightly-curved form, and the upper and lower ends of the rods $b$ are connected by bars $l\ l$ to the inner ends of arms $m$, the outer ends of the arms being fitted and allowed to work freely in eyes or bearings $n$, attached to the platform. The cutters F are fitted loosely on the rods $a$, but are permanently attached to the rods $b$. The back part of the platform A is of curved form, and standards $o\ o'\ o''$ are attached to it, the said standards having horizontal rails $p$ attached to form guards.

To the back central standard, $o'$, a horizontal bar, H, having two arms, $q\ q$, is attached. This bar H, with its arms attached, is allowed to swing freely on its standard $o'$, the arms $q$ being over the platform A.

I represents a swinging gate, which is attached to a standard, $o''$, at the back part of the platform. This gate is formed by attaching rails $r$ to an upright, $s$, which has links $t$ attached to it, said links being fitted loosely on the upright $s$. The rails $r$ are sufficiently long to reach and bear against the standard $o'$ when the gate I is closed.

J is an inclined plane or drag-plate, attached to the back part of the platform A and in line with the gate I.

The operation is as follows: As the machine is drawn along the two cutters F F are made by means of the gearing described to work over the stationary cutters E E, the rods $a\ b$, in consequence of being attached to the arms $c\ c'$, describe a circle, and as the cutters E E are attached rigidly to the rods $b$ and the rods $a$ are allowed to pass loosely through the ends of the cutters the cutting-edges of the cutters are always presented or kept facing the direction of their cut, or have about the same position at all points of their movement. The stalks (shown in red) are cut at the inner parts of the recesses D D between the cutters E F, the latter operating as shown and passing directly over the cutters E. The teeth or arms R, which have the same movement as the cutters F, pass the cut stalks on the platform A, said stalks passing in an upright position into the rounded back part of the guard formed by the standards o o' o'' and the rails p; and when a sufficient quantity of cut stalks has accumulated at the back part of the platform to form a shock the attendant, who stands on the platform, moves the bar H, the arms q q of which extend from the standard o' to the standard o, and are secured in proper position by a link, $a^x$. The attendant, when moving the bar H, turns it in the direction indicated by the arrow 1, and in the position shown by red, and the cut stalks are collected or compressed between the gate I and the arms q q, and are bound by the attendant while in that position, and when bound the arms q q are moved still farther around until the bar H will be free from the center rail, r, of the gate I, and said gate will be thrown open and the shock discharged upon the ground. The gate I is then closed and secured in a closed state by the bar H, as shown in black in Fig. 2, until a sufficient quantity of stalks has accumulated at the back of the platform, when the operation of binding and discharging is repeated.

I do not claim the cutters F, operating as shown, so as to effect, in connection with the stationary cutters E, the desired result, irrespective of the peculiar arrangement and means employed for operating the cutters F, for such cutting device has been previously used; but,

Having thus described my invention, what I claim as new, and desire to secure by Letters Patent, is—

1. Attaching the cutters F to the rods a b, the rods b being provided with arms k, and the rods and arms operated from the wheels B through the medium of the gearing G j f g and arms c, when the above parts are used in combination with the stationary cutters E at the inner parts of the recesses D, for the purpose herein set forth.

2. The bar H, provided with the arms q, in combination with the gate I, the above parts being attached to the platform A and used in connection with a railing or guard so as to operate as and for the purpose set forth.

3. The cutting device formed of the cutters E F, connected with rakes or teeth R, arranged to operate as shown, in combination with the discharging device formed of the gate I and bar H, the whole operating as and for the purpose specified.

ISAAC V. ADAIR.

Witnesses:
HUGH MONTGOMERY,
A. R. WHEELER.